United States Patent
LeVey et al.

(10) Patent No.: US 6,249,631 B1
(45) Date of Patent: Jun. 19, 2001

(54) METHOD AND APPARATUS FOR CUTTING SOLID CORE FIBER OPTIC CABLE

(75) Inventors: Kenneth LeVey, West Chicago; Christopher Casey, Joliet; Jason Colwell, Ludlow, all of IL (US); Maitreya Madhyastha, Riverdale, NJ (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/364,793

(22) Filed: Jul. 30, 1999

(51) Int. Cl.⁷ ....................................... G02B 6/00
(52) U.S. Cl. ........................... 385/134; 65/433
(58) Field of Search .................... 385/134–138, 385/147, 55, 60; 65/433

(56) References Cited

U.S. PATENT DOCUMENTS

| | | | |
|---|---|---|---|
| 2,483,511 | 10/1949 | Vickers | 83/176 |
| 4,167,304 | * 9/1979 | Gelbke | 385/60 |
| 4,793,683 | * 12/1988 | Cannon, Jr. et al. | 385/60 |
| 5,188,268 | * 2/1993 | Hakoun et al. | 225/96.5 |
| 5,263,106 | * 11/1993 | Rosson | 385/72 |
| 5,446,818 | 8/1995 | Baker et al. | 385/78 |
| 5,644,672 | 7/1997 | Tanaka | 385/137 |
| 5,668,904 | 9/1997 | Sutherland et al. | 385/72 |
| 5,682,450 | 10/1997 | Patterson et al. | 385/65 |
| 5,724,466 | * 3/1998 | Rickenbach et al. | 385/60 |
| 5,812,718 | 9/1998 | Carpenter et al. | 385/97 |

* cited by examiner

Primary Examiner—John D. Lee
Assistant Examiner—Michelle R. Connelly-Cushwa
(74) Attorney, Agent, or Firm—John P. O'Brien; Mark W. Croll; Donald J. Breh

(57) ABSTRACT

A method for preparing a fiber optic cable for a splice wherein a radial compressive strain is applied to the fiber optic cable and the fiber optic cable is cut adjacent to the applied radial compressive strain to create a splice end of the fiber optic cable having a convex bulb. A corresponding device for preparing a fiber optic cable for a splice comprises a cutting means for cutting a fiber optic cable into a waste end and a splice end and a collet for applying a radial compressive strain to the fiber optic cable adjacent to the cutting means of the tool.

18 Claims, 3 Drawing Sheets

METHOD AND APPARATUS FOR CUTTING SOLID CORE FIBER OPTIC CABLE

BACKGROUND OF THE INVENTION

1. Field of the Invention

This invention relates to a method and apparatus for preparing a solid core fiber optic cable for a splice by applying a radial compressive strain to a waste end of the solid core fiber optic cable.

2. Description of Prior Art

Solid core fiber optic cable is commonly used to create a light source where light fixtures would be otherwise difficult to locate; to replace systems of multiple light bulbs; to reduce heat output at a light source; and/or many other practical and aesthetic applications. For instance, in the automotive industry, a single centralized light engine supplying light to a series of fiber optic cables can replace multiple light bulbs and fixtures by providing light to headlights, marker lights, runner lights, dome lights and instrument panels. As a result of the proliferation of fiber optic cable in such widespread applications, repairs, replacements and retrofits of fiber optic cable systems are often necessary. Therefore, an effective method and apparatus for creating a splice and maintaining a coupling between two ends of fiber optic cable, with minimum light loss, is necessary.

The Specification and Claims use the terms "solid core fiber optic cable" and "fiber optic cable" interchangeably. The method and apparatus of this invention are intended for use with fiber optic cable having an outer polymeric jacket and a light-transmitting inner core. Unlike fiber optic cable used for data communication that has a cross-section the size of a strand of hair, solid core fiber optic cable typically has a core diameter of between approximately 1 and 26 mm.

One such solid core fiber optic cable is Optiflex™ fiber optic cable made by Rohm and Haas of Philadelphia, Pa. Such fiber optic cable typically comprises three different materials: an acrylic copolymer inner core; a thin Teflon™ cladding used for reflection purposes; and a polyethylene outer jacket for protection. During the processing of the core, which in one embodiment is 7.1 mm in diameter, the cladding is extruded and joined with the inner core while in a molten state, thus providing a smooth interface between the inner core and the cladding. This smooth interface is beneficial to the transmission of light through the fiber optic cable for consistent reflection.

Fiber optic cable is currently cut or spliced using a hand tool having a spring biased Teflon™ coated razor blade. A guillotine-like action cuts through the outer jacket, the cladding and the inner core of the fiber optic cable resulting, at least initially, in a generally smooth inner core profile ready for a splice.

However, after the fiber optic cable is cut, for instance to prepare a splice between two lengths of fiber optic cable, the cladding and the inner core tend to delaminate and thus separate. This separation allows the inner core to relieve the residual tensile stresses imparted during the polymer curing process which results in a retracted, typically concave, inner core surface profile relative to the cladding and the outer jacket.

When two lengths of fiber optic cable having a retracted inner core surface profile are joined or spliced together, the result is an air gap between the opposing inner cores within the outer jackets. Such an air gap greatly reduces the effective light transmission through a spliced fiber optic cable. Mechanical fasteners exist that will hold and maintain a splice between two lengths of fiber optic cable, however, an effective method and apparatus to prepare a fiber optic cable for a splice is needed.

SUMMARY OF THE INVENTION

The method and apparatus according to this invention preferably result in a splice end of fiber optic cable having an inner core configured in a convex bulb. This convex bulb configuration results in intimate contact between opposing inner cores of adjacent splice ends of fiber optic cable. The intimate contact between opposing convex bulbs in adjacent splice ends results in greatly reduced light losses in a spliced fiber optic cable over the prior art.

A method for preparing fiber optic cable for a splice preferably comprises applying a radial compressive strain to a waste end of the fiber optic cable and cutting the fiber optic cable adjacent to the applied radial compressive strain. The resultant splice end of the fiber optic cable comprises a convex bulb facilitating intimate contact with an opposing convex bulb.

Preferably, the radial compressive strain is applied uniformly around a circumference of the fiber optic cable thus resulting in a uniformly shaped convex bulb having a symmetrical surface profile. When the splice ends of two fiber optic cables are joined together, the symmetrical surface profiles of the corresponding convex bulbs create uniform intimate contact between the corresponding convex bulbs and thus minimizes light loss through the resulting splice. The splice ends of each of two fiber optic cables are typically joined together using a mechanical fitting.

According to a preferred embodiment of the invention, the radial compressive strain is applied to the fiber optic cable using a collet. The collet preferably comprises a sleeve having a tapered or stepped inner surface and a corresponding collet sleeve for adjusting the applied radial compressive strain.

The device according to this invention is preferably adaptable to any cutting means known to those having ordinary skill in the art. The cutting means is preferably positioned directly adjacent to the applied radial compressive strain and in a position to cut perpendicularly with respect to a longitudinal axis of the fiber optic cable.

It is one object of this invention to provide a method for splicing fiber optic cable that avoids excess light loss in the resultant splice.

It is another object of this invention to provide a method for splicing fiber optic cable to promote intimate contact and thus avoid an air gap between two spliced ends of fiber optic cable.

It is another object of this invention to provide a device that results in a fiber optic cable having a splice end with a convex bulb.

It is still another object of this invention to provide a device for use in connection with existing fiber optic cable cutting tools.

It is yet another object of this invention to provide a device for preparing a splice end of a fiber optic cable that is capable of intimate contact and adhesion with an opposing splice end.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
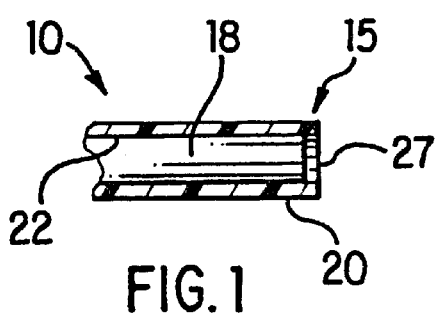
FIG. 1 is a cross-sectional view of a splice end of fiber optic cable according to prior art methods of cutting fiber optic cable.

FIG. 1 shows a cross-sectional view of splice end 15 of fiber optic cable 10 according to prior art methods of cutting fiber optic cable 10. Prior art methods of cutting fiber optic cable 10 typically involve a quick, straight cut though a longitudinal axis of fiber optic cable. 10 Fiber optic cable 10 often includes inner core 18, outer jacket 20 and cladding 22 positioned therebeteween. Such a cut ultimately results in the surface profile shown in FIG. 1. As shown in FIG. 1, inner core 18 retracts from splice end 15 of outerjacket 20 resulting in an air gap 27 between inner core 18 and splice end 15. The resultant air gap 27 creates light transmission losses when two similar splice ends 15 are joined. Such light transmission losses have been measured at 12% or more per splice. As a result, a length of fiber optic cable 10 having multiple splices is subject to appreciable light loss and reduction of performance of fiber optic cable 10 as a light source.

Figure 2:
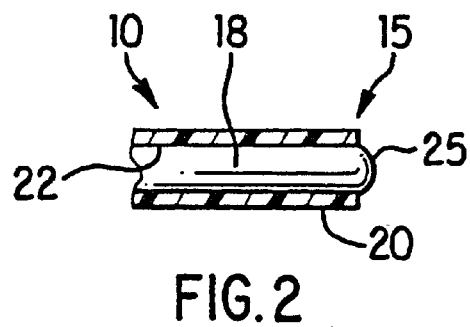
FIG. 2 is a cross-sectional view of a splice end of fiber optic cable according to one preferred embodiment of this invention.

As shown in FIG. 2, splice end 15 according to one preferred embodiment of this invention comprises inner core 18 configured in a convex bulb 25. This convex bulb 25 configuration results in intimate contact between inner cores 18 of adjacent splice ends 15 of fiber optic cable 10. The intimate contact between convex bulbs 25 in adjacent splice ends 15 results in average light losses of under 3.4%.

Figure 3A:
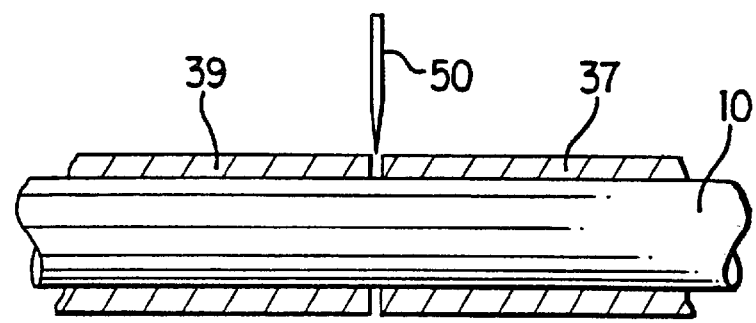
FIG. 3A is a diagrammatic partial cross-sectional view of a fiber optic cable in a relaxed state according to one preferred embodiment of this invention.
Figure 3B:
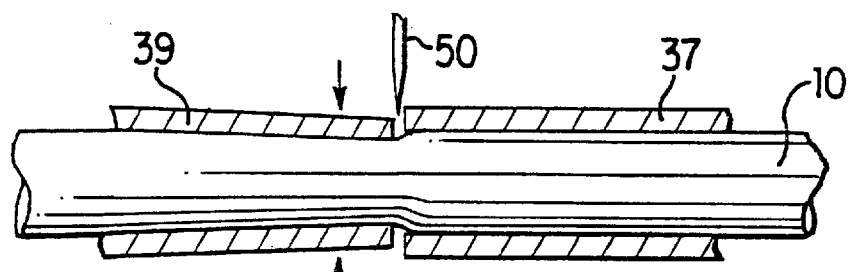
FIG. 3B is a diagrammatic partial cross-sectional view of the fiber optic cable shown in FIG. 3A upon application of a radial compressive strain.
Figure 3C:
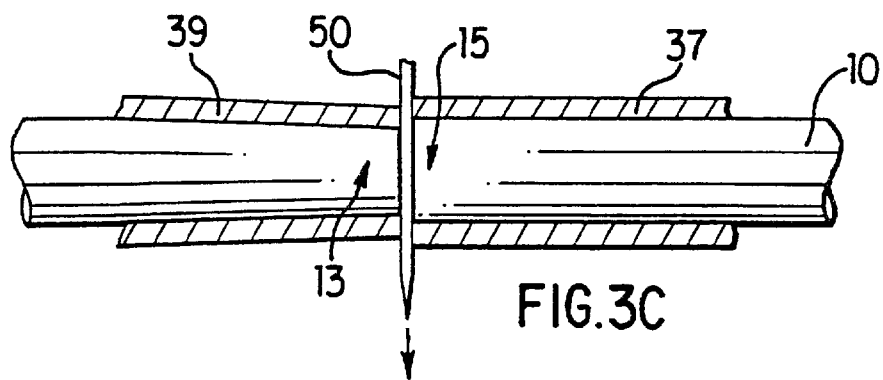
FIG. 3C is a diagrammatic partial cross-sectional view of the fiber optic cable shown in FIG. 3B during a cut.
Figure 3D:
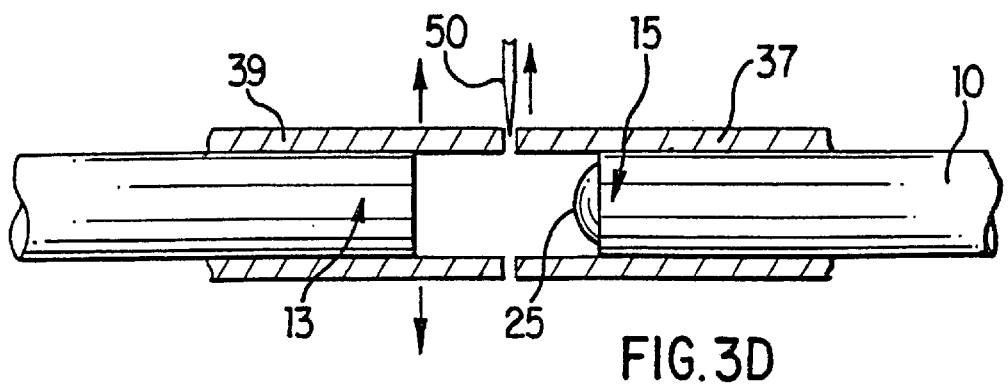
FIG. 3D is a diagrammatic partial cross-section view of the fiber optic cable shown in FIG. 3C after the fiber optic cable is cut and the radial compressive strain is released.

FIGS. 3A–3D diagrammatically illustrate a method for preparing fiber optic cable 10 for a splice according to one preferred embodiment of this invention. As shown in FIG. 3B, a radial compressive strain, indicated by the arrows, is applied to a waste end of fiber optic cable 10. As shown in FIG. 3C, fiber optic cable 10 is cut adjacent to the applied radial compressive strain. After release of the radial compressive strain, FIG. 3D shows the resultant splice end 15 of fiber optic cable 10 having convex bulb 25 as described above and shown in FIG. 2.

Waste end 13 of fiber optic cable 10, shown in FIG. 3D, describes the portion of fiber optic cable 10 that is cut away and discarded from splice end 15 of fiber optic cable 10. The length of waste end 13 of fiber optic cable 10 is preferably minimized to avoid excess waste and expense.

In one preferred embodiment of this invention, the radial compressive strain is applied uniformly around a circumference of fiber optic cable 10. Such a uniformly applied radial compressive strain results in a uniformly shaped convex bulb 25. Convex bulb 25 thus will preferably comprise a symmetrical surface profile. When splice ends 15 of two fiber optic cables 10 are joined together, the symmetrical surface profiles of the corresponding convex bulbs 25 will result in uniform intimate contact between the corresponding convex bulbs 25 and thus minimize light loss through the resulting splice.

According to one preferred embodiment of this invention a 16.8% radial compressive strain is applied to fiber optic cable 10. The exact radial compressive strain is preferably selected based upon a size of convex bulb 25 that is repeatable across many fiber optic cables 10. By minimizing the size of convex bulb 25 in a repeatable fashion, larger convex bulbs 25 are avoided which often resist the axial compression required between splice ends 15 to create a splice or joint.

If a non-uniform radial compressive strain is applied to fiber optic cable 10, the resultant splice end 15 typically comprises a non-uniform bulge. When one or more non-uniform bulges from two splice ends 15 of fiber optic cable 10 are joined, any areas of the non-uniform bulge that do not intimately contact the corresponding splice end 15 will result in light loss through the spliced fiber optic cable 10.

According to one preferred embodiment of this invention, splice ends 15 of each of two fiber optic cables 10 are joined together using a mechanical fitting. Although not shown in the drawings, the mechanical fitting may comprise a device that maintains a compressive axial force between two splice ends 15 of fiber optic cable 10. The mechanical fitting may be a collar or clamp or other fitting known to those having ordinary skill in the art. According to one preferred embodiment of this invention, inner core 18 of fiber optic cable 10 is of a relatively low durometer so that inner core 18 material adheres to itself. Therefore, if two splice ends 15 are joined in axial compression, intimate coupling is obtained, in part, by inner cores 18 of opposing splice ends 15 becoming a single homogenous core.

Depending upon the desired mechanical fitting and/or the desired application, it may be preferable to adjust one or more dimensions of convex bulb 25. In one preferred embodiment of this invention, one or more dimensions of convex bulb 25 may be adjusted by adjusting the radial compressive strain applied to the waste end of fiber optic cable 10. For instance, as the radial compressive strain is increased, convex bulb 25 increases in axial length.

According to one preferred embodiment of this invention and as shown in FIGS. 3A-3D, fiber optic cable 10 is cut perpendicular with respect to a longitudinal axis of fiber optic cable 10. A perpendicular cut results in a symmetrical and uniform surface profile of convex bulb 25. In an alternative embodiment of this invention, fiber optic cable 10 is cut at an angle with respect to the perpendicular resulting in a non-uniform splice end 15. Two corresponding non-uniform splice ends 15 are subsequently joined together resulting in intimate contact between the splice ends 15 and therefore a minimum of light loss in transmission through the spliced fiber optic cable 10.

According to another preferred embodiment of this invention, fiber optic cable 10 is cut using a lubricated cutting means. The lubricated cutting means may comprise a TeflonTm coated razor blade, a cutting fluid sprayed on a blade prior to the cut or other lubricated cutting means known to those having ordinary skill in the art. Lubrication of the cutting means minimizes imperfections on the surface of inner core 18, such as striations along convex bulb 25. Imperfections on the surface of inner core 18 result in light diffraction and/or internal reflection at the splice or joint resulting in degradation of light transmission through splice ends 15 of fiber optic cable 10. Fewer imperfections on the surface of inner core 18 results in better light transmission between splice ends 15 of fiber optic cable 10.

Figure 5:
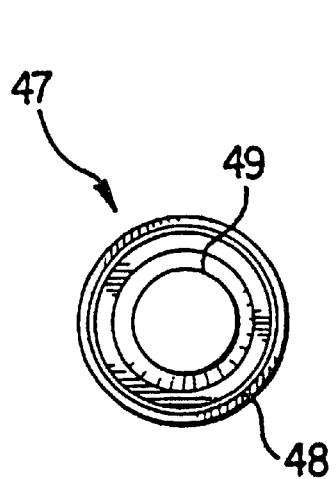
FIG. 5 is a bottom view of a collet sleeve according to one preferred embodiment of this invention.
Figure 6:
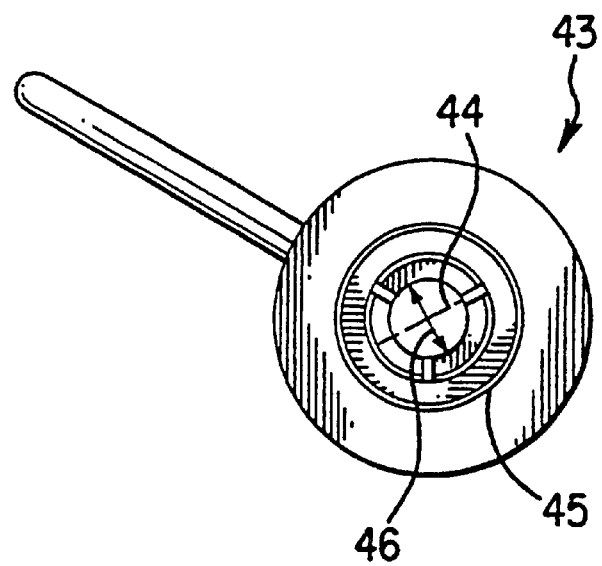
FIG. 6 is a top view of a collet according to one preferred embodiment of this invention.
Figure 4:
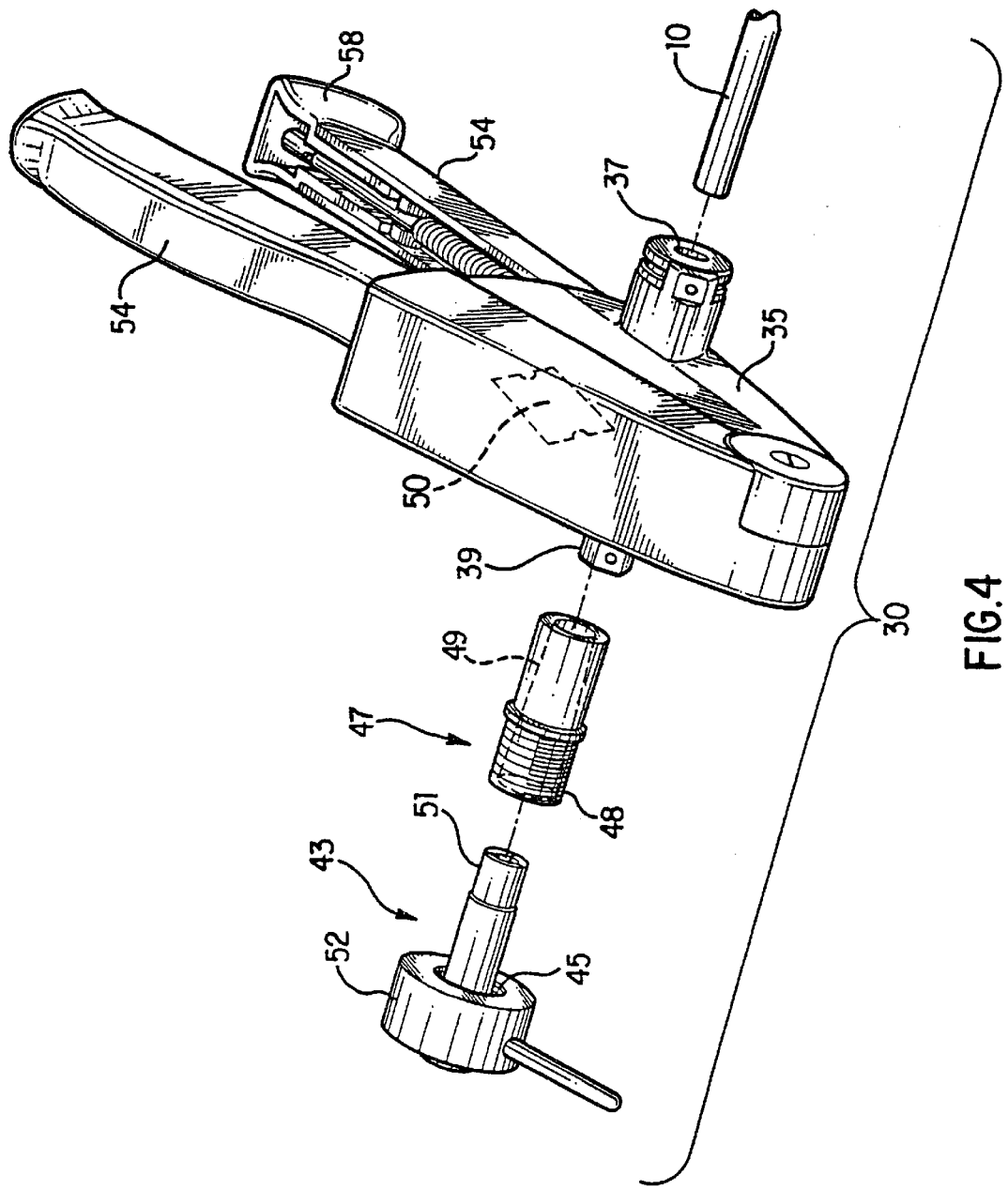
FIG. 4 is an exploded perspective view of a device for cutting fiber optic cable according to one preferred embodiment of this invention.

According to a preferred embodiment of the invention shown in FIGS. 4-6, the radial compressive strain is applied to fiber optic cable 10 using collet 43, such as collet 43 shown in FIG. 6. Collet 43 preferably comprises a sleeve having a tapered or stepped inner surface. Collet 43 is preferably adjustable to expand or contract an inner diameter, as described below.

As shown in FIG. 4, tool 30 for cutting fiber optic cable 10 into a waste end and splice end 15 comprises housing 35, inlet end 37 and outlet end 39. Inlet end 37 of housing 35 preferably receives splice end 15 of fiber optic cable 10. A diameter of inlet end 37 is preferably sized to accept one or more diameters of fiber optic cable 10. Outlet end 39 of housing 35 preferably receives the waste end of fiber optic cable 10 and is similarly sized to accept one or more diameters of fiber optic cable 10.

Cutting means 50 is preferably positioned between inlet end 37 and outlet end 39 of housing 35. In one preferred embodiment of this invention shown in FIG. 4, cutting means 50 is embodied in a commercially available fiber optic cable cutter manufactured by Rohm and Haas. The fiber optic cable cutter uses a pretensioned cutting means 50, such as a razor blade, to cut fiber optic cable 10 in a guillotine-like fashion. When handles 54 are squeezed together, a spring biases the cutting means 50 until release lever 58 is actuated, resulting in release of the razor blade through each layer of fiber optic cable 10. As discussed above, cutting means 50 is preferably positioned perpendicular with respect to a longitudinal axis of fiber optic cable 10.

According to one preferred embodiment of this invention, collet 43 is positioned with respect to outlet end 39 of housing 35 and held into position with a set screw or similar means. Collet 43 preferably comprises interior end 51 and handle end 52. With proper adjustment, collet 43 preferably applies a radial compressive strain to the waste end of fiber optic cable 10. In one preferred embodiment of this invention shown in FIGS. 4 and 6, collet 43 preferably comprises a split sleeve or tubular element having a stepped interior surface resulting in first inner diameter 44 and second inner diameter 46. First inner diameter 44 preferably is sized to permit free passage of fiber optic cable 10. Second inner diameter 46 is preferably located at interior end 51 and is sized slightly in excess of a diameter of fiber optic cable 10. Second inner diameter 46 of collet 43 is preferably adjustable to a size less than the diameter of fiber optic cable 10, such as through the split configuration shown in FIGS. 4 and 6. Collet 43 is subject to other configurations that permit adjustment of an inner surface diameter known to those having ordinary skill in the art.

According to one preferred embodiment of this invention, collet 43 is adjustable with collet sleeve 47 to vary the applied radial compressive strain. Collet sleeve 47, shown in one preferred embodiment in FIGS. 4 and 5, comprises a sleeve having a threaded end 48 and an internal tapered surface 49. Collet sleeve 47 preferably engages with receiving threads 45 in collet 43. As collet 43 is threaded onto collet sleeve 47, such as with handle end 52 shown in FIGS. 4 and 6, and collet 43 progress into internal tapered surface 49 of collet sleeve 47, second inner diameter 46 preferably is reduced.

Cutting means 50 is preferably positioned directly adjacent interior end 51 of collet 43. The application of radial compressive strain preferably takes place largely within interior end 51 of collet 43 and counteracts the residual stresses present between inner core 18 and outer jacket 20. In one preferred embodiment of this invention, cutting means 50 is positioned to cut approximately 0.002" from interior end 51 of collet 43.

Collet 43 and collet sleeve 47 or similar device for applying a radial compressive strain is preferably adaptable for use with any cutting means 50. Hand held cutting means 50 such as shown in FIG. 4 are especially useful for field work requiring splicing of fiber optic cable 50. The device according to this invention is preferably similarly adaptable to production equipment used in the manufacture and segmentation of pre-cut lengths of fiber optic cable 10.

While in the foregoing specification this invention has been described in relation to certain preferred embodiments thereof, and many details have been set forth for purpose of illustration, it will be apparent to those skilled in the art that the method and apparatus according to this invention are susceptible to additional embodiments and that certain of the details described herein can be varied considerably without departing from the basic principles of the invention.

We claim:

1. A method for preparing a fiber optic cable for a splice comprising the steps of:

applying a generally uniform radial compressive strain around a circumference of the fiber optic cable; and cutting the fiber optic cable adjacent to the applied radial compressive strain to create a splice end of the fiber optic cable having a convex bulb.

2. The method of claim 1 further comprising the step of joining the splice end of each of two fiber optic cables together using a mechanical fitting.

3. The method of claim 1 further comprising the step of adjusting the radial compressive strain to adjust a dimension of the convex bulb.

4. The method of claim 1 wherein the radial strain is applied to the fiber optic cable using a collet.

5. The method of claim 1 wherein the fiber optic cable is cut perpendicular with respect to a longitudinal axis of the fiber optic cable.

6. The method of claim 1 wherein the convex bulb further comprises a symmetrical surface profile.

7. The method of claim 1 further comprising cutting the fiber optic cable using a lubricated cutting means.

8. A tool having a cutting means for cutting a fiber optic cable into a waste end and a splice end, the tool comprising:

a collet positioned around the fiber optic cable adjacent to the cutting means of the tool, the collet for applying a generally uniform radial compressive strain;

wherein the splice end of the fiber optic cable comprises a convex bulb.

9. The tool of claim 8 wherein the waste end of the fiber optic cable comprises a concave core.

10. The tool of claim 8 wherein the collet is adjustable to vary the applied radial compressive strain.

11. The tool of claim 8 wherein the cutting means is positioned to cut perpendicular to a longitudinal axis of the collet.

12. The tool of claim 8 wherein the collet comprises an internal surface having a first diameter and a second diameter.

13. The tool of claim 12 wherein a collet sleeve is threadably engaged with respect to the collet.

14. A tool for cutting a fiber optic cable into a waste end and a splice end, the tool comprising:

a housing;

an inlet end of the housing for receiving the splice end of the fiber optic cable;

an outlet end of the housing for receiving the waste end of the fiber optic cable;

a collet positioned with respect to the outlet end of the housing, the collet applying a generally uniform radial compressive strain to the waste end of the fiber optic cable;

a cutting means positioned between the inlet end of the housing and the outlet end of the housing, such that the cutting means is adjacent the collet.

15. The tool of claim 14 wherein the collet is adjustable with a collet sleeve to vary the applied radial compressive strain.

16. The tool of claim 14 wherein the splice end of the fiber optic cable comprises a convex bulb.

17. The tool of claim 14 wherein the cutting means is positioned to cut perpendicular with respect to a longitudinal axis of the collet.

18. The tool of claim 14 wherein the cutting means is positioned to cut the fiber optic cable approximately 0.002" from an interior end of the collet.

* * * * *